United States Patent
Le (10) Patent No.: US 6,631,514 B1
(45) Date of Patent: Oct. 7, 2003

(54) EMULATION SYSTEM THAT USES DYNAMIC BINARY TRANSLATION AND PERMITS THE SAFE SPECULATION OF TRAPPING OPERATIONS

(75) Inventor: Bich-Cau Le, San Jose, CA (US)

(73) Assignee: Hewlett-Packard Development, L.P., Houston, TX (US)

(*) Notice: Subject to any disclaimer, the term of this patent is extended or adjusted under 35 U.S.C. 154(b) by 843 days.

(21) Appl. No.: 09/003,572

(22) Filed: Jan. 6, 1998

(51) Int. Cl.$^7$ .................................................. G06F 9/45
(52) U.S. Cl. ....................... 717/137; 717/136; 717/151; 717/159
(58) Field of Search ................................. 395/704, 707, 395/709, 705; 717/137, 136, 151, 159

(56) References Cited

U.S. PATENT DOCUMENTS

| | | | | |
|---|---|---|---|---|
| 5,313,614 A | * | 5/1994 | Goettelmann et al. | 717/138 |
| 5,339,238 A | * | 8/1994 | Benson | 717/159 |
| 5,404,533 A | * | 4/1995 | Ando | 717/136 |
| 5,432,795 A | * | 7/1995 | Robinson | 717/125 |
| 5,450,575 A | * | 9/1995 | Sites | 717/128 |
| 5,507,030 A | * | 4/1996 | Sites | 717/136 |
| 5,548,717 A | * | 8/1996 | Wooldridge et al. | 717/124 |
| 5,551,015 A | * | 8/1996 | Goettelmann et al. | 717/137 |
| 5,577,233 A | * | 11/1996 | Goettelmann et al. | 703/26 |
| 5,584,023 A | * | 12/1996 | Hsu | 707/204 |
| 5,598,560 A | * | 1/1997 | Benson | 717/159 |
| 5,649,203 A | * | 7/1997 | Sites | 717/156 |
| 6,031,993 A | * | 2/2000 | Andrews et al. | 717/143 |
| 6,282,579 B1 | * | 8/2001 | Carre | 709/313 |
| 6,425,118 B1 | * | 7/2002 | Molloy et al. | 717/136 |
| 6,546,549 B2 | * | 4/2003 | Li | 717/137 |

OTHER PUBLICATIONS

Chen, W.Y., "Data Preload for Superscalar and VLIW Processors," PhD Thesis, University of Illinois, Urbana–Champaign, IL, Jul. 1993.

Mahlke, S., et al. "Sentinel Scheduling for VLIW and Superscalar Processors," ASPLOS–V Conference Proceedings, p. 238–247, Oct. 1992.

Rau, B., "PlayDoh External Architecture Specification," Technical Report 93–80 Hewlett–Packard Laboratories, Feb. 1994, revised Kathail, V., HPL–PD Architecture Specification: Version 1.1, HPL 93–80(R.1), HP Laboratories Palo Alto, Feb. 2000.

Cmelik, R. et al., "Shade: A Fast Instruction Set Emulator for Execution Profiling," Sun Microsystems Technical Report UWCSE Jun. 5, 1993.

* cited by examiner

Primary Examiner—Paul P. Gordon
Assistant Examiner—Kelvin Booker (57) ABSTRACT

The inventive emulator dynamically translates instructions in code written for a first architecture into code for a second architecture. The emulator designates various checkpoints in the original code, and speculatively reorders the placement of the translated code instructions according to optimization procedures. If during the execution of the reordered code, a trap should occur, then the emulator resets the original code to the most recent checkpoint and begins executing the original code sequentially in a line-by-line manner until the section is completed or branched out of. The original code is reset by changing the program counter to the checkpoint, and reversing the effects of each instruction which has been executed subsequent to the checkpoint. Thus, any native instructions which correspond to original instructions which occur sequentially prior to the checkpoint have been executed, and any native instructions which correspond to original instructions which occur sequentially subsequent to the checkpoint have not been executed.

52 Claims, 3 Drawing Sheets

| MEM 0 | MEM 1 | ALU 0 | ALU 1 |
|---|---|---|---|
| (pi) $a_1$ | (pi) $d_2$ | (pi) $d_1$ | (pi) $b_4$ |
| (pi) $e_1$ | | | |
| | (pi) $a_2$ | (pi) $c_1$ | |
| (pi) $b_3$ | | (pi) $a_3$ | |
| | | | |
| | | (pi) $a_4$ | (pi) $a_5$ |
| | (pi) $e_2$ | (pi) $d_5$ | (pi) $c_2$ |
| | (pi) $a_6$ | | |
| | | | |
| (pi) $d_4$ | (pi) $b_1$ | (pi) $e_4$ | |
| | | | |
| | (pi) $b_2$ | | |
| (pi) $e_3$ | (pi) $d_3$ | | |
| | | (pi) $c_3$ | (pi) $e_3$ |

…

EMULATION SYSTEM THAT USES DYNAMIC BINARY TRANSLATION AND PERMITS THE SAFE SPECULATION OF TRAPPING OPERATIONS

REFERENCE TO RELATED APPLICATIONS

Reference is also made to the following commonly assigned, U.S. Pat. No. 6,243,688, entitled INSTRUCTION SET INTERPRETER WHICH USES A REGISTER STACK TO EFFICIENTLY MAP AN APPLICATION REGISTER STATE, and U.S. Pat. No. 6,230,182, entitled COMPUTER LANGUAGE INTERPRETER WHICH CAN PERFORM TIME-CONSUMING OPERATIONS WITH MINIMAL IMPACT ON INTERACTIVE PROGRAMS, respectively.

TECHNICAL FIELD OF THE INVENTION

This application relates in general to an emulator which uses dynamic binary translation, and in specific to a scheduling technique which allows an emulator to speculate instructions optimistically to exploit instruction-level parallelism.

BACKGROUND OF THE INVENTION

Binary translation is a rapidly evolving emulation technology which addresses the object code compatibility problem associated with the introduction of a new instruction set architecture (ISA). Recent implementations of this technology use dynamic translation techniques to convert a program compiled for a legacy ISA to object code for a native ISA at run-time. Thus, a binary translator permits programs or applications that were compiled for a pre-existing architecture to be run on a new architecture without having to recompile those applications. The binary translator translates the complied application into binary form which is used on the new system. Note that this is transparent to the system user.

Binary translation is the process of directly translating object code compiled for one instruction set architecture (the legacy ISA) to object code for another architecture (the native ISA). This allows software transition between two dissimilar ISAs. For example, programs written for Intel Microprocessors may be translated to run on Alpha processors. Moreover, binary translation may be performed at run-time, thus allowing a legacy ISA program to be launched unmodified on the native ISA system. This type of performance is known as dynamic translation.

However, a problem occurs with dynamic translation when the native machine is statically scheduled, i.e., operations are issued in program order and must be carefully grouped to take advantage of parallelism. In order to exploit the parallel execution resources, modern compilers use heuristics or profile-guided optimizations to expose instruction-level parallelism (ILP) in the program. These compilation techniques are difficult to implement in a dynamic translation system, because they are often time and space intensive. ILP compilation algorithms usually take a lot of time and memory because the compiler needs to analyze the program to detect which instructions can be executed in parallel.

Consequently, the prior art translators do not utilize the ILP of the native system, and merely sequentially process the instructions, i.e. the instructions are ordered in the same order as in the original program. For example, assume that in an original program an add instruction is followed by subtract instruction, which in turn is followed by a load instruction. Thus, a prior art translator would translate these instructions in binary instructions for use on the native system, and would order the instructions as add, subtract, and load, even though the load could be speculatively performed prior to the add instruction.

Thus, the prior art surrenders potential performance gains from the parallel nature of the native system in order to maintain simplistic translator. By keeping the translator simple, the prior art avoids false traps or exceptions arising in the translated instructions. There are two types of exceptions: true and false. True exceptions are caused by the application, and must be handled in all cases. Not re-ordering the instruction stream simplifies recovery from true exceptions because the interrupted state always is sequentially updated. False exceptions, on the other hand, can only be the result of speculation. They do not normally occur if the program is not reordered. For example, in the code sequence:

1000: r1=r2+r3
1001: branch to 1003 if r4 is an invalid pointer
1002: r5=load memory from (r4)
1003: r6=r6−1

Without reordering, 1002 would always access a valid pointer and would never trap. However, it is possible for an optimizer to speculate 1002 above 1001, which could sometimes cause a false exception. Moreover if a true trap does occur, by maintaining the original instruction sequence, then the state of the system appears as though all of the operations preceding the trapping instruction in the original program have completed, and all the operations following that instruction have never been executed. So, by preserving the original instruction order, then recovery from traps or exceptions is made relatively easier.

Thus, the prior art translators use of strict sequencing of instructions results in poor performance of translated programs on the native system.

Therefore, there is a need in the art for a translator that allows the translated instructions to be reordered in a different and more efficient way on the target architecture, and thus yields better performance, and yet can manage exceptions or traps.

SUMMARY OF THE INVENTION

These and other objects, features and technical advantages are achieved by an emulation system and method which allows translation with optimistically speculated operations. However, if an exception occurs, then an interpreter is invoked to return the system state to a point prior to the trap. The interpreter then executes the program sequentially without reordering.

At run-time, the inventive emulator analyzes branch behavior, selects code paths which are likely to be taken, and selects suitable legacy code for optimization. A translator then dynamically compiles those regions into native code and optimizes them using a fast ILP scheduling algorithm. The inventive emulator allows potentially trapping operations to be speculated above branches while preserving a legacy or original ISAs precise exceptions property. This property requires that if a legacy ISA instruction causes an exception, the interrupted architectural state must appear as though all preceding instructions in the program have completed and all following instructions never executed. The inventive translator uses a system of checkpoints and the ability to retranslate a block of code in order to recover from exceptions and restart the legacy application in a known state. A block is also retranslated with speculation disabled if it contains a speculative operation which traps too often. The code is scheduled in such a way that if an operation traps, the translator's exception handler can always revert the legacy ISA state back to a safe checkpoint corresponding to a point in the legacy program's execution history prior to the exception. The interpreter is then used to execute instructions between the checkpoint and the trapping operation. The second time the trapping operation raises the same exception, the legacy ISA state appears to have been sequentially updated and can safely be delivered to the application's own handler.

Optimizing or reordering of instructions is very important to system performance. For example, suppose there are two instructions A and B, and B is a load from memory. Load instructions can require many cycles of clock time to complete, thus it is advantageous to perform the B load instruction prior to the A instruction to hide some, if not all, of the latency of the load instruction. This optimist or speculative performance of the load instruction, and other types of instructions, such as floating-point operations, will result in higher performance.

Note that the inventive emulator will allow the optimization where there is a change in the architecture or because the old, legacy code was not written well. More specifically, the legacy program could be an older program where instruction B is ordered after instruction A, but is not required to be so. Also, the native architecture may have more functional units, such as registers, processors, etc., which allows the execution operations in parallel. Thus, the inventive translator allows the use of features of the new, native architecture that the old, legacy system did not have.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Figure 1:
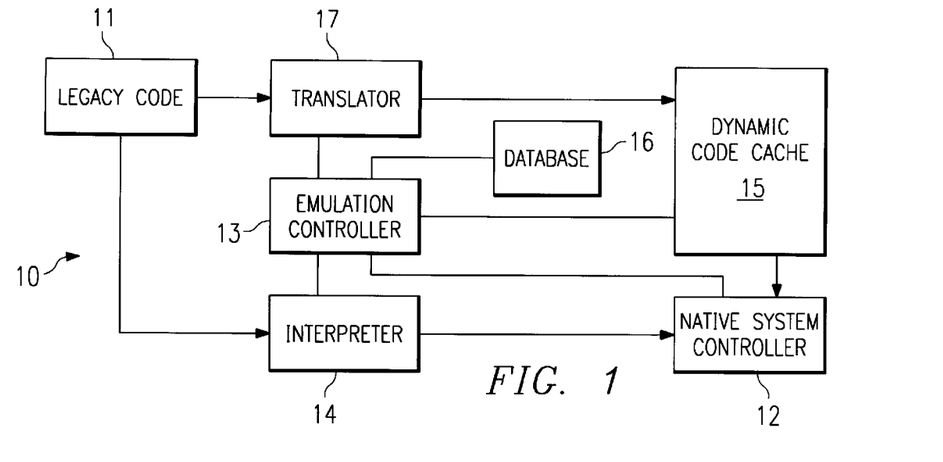
FIG. 1 depicts inventive emulation system which converts the original legacy code for use in the native system.

FIG. 1 depicts inventive emulator 10 interacting with the original legacy code 11 and the native system controller 12. The emulator 10 executes and reproduces the effects of legacy code 11. The process of emulation is either performed by interpreting legacy instructions one at a time, or by executing a translated block of code, which reproduces the behavior of a block of legacy code on the native machine. The emulation controller 13 manages the emulation process, including deciding when to translate a code region. The controller 13 also manages mode switches between translated code and the interpreter. As shown in FIG. 1, the interpreter 14 emulates the legacy code 11, in a instruction by instruction manner, and supplies the emulated code directly to the native system controller 12 for use in the native system. Note that the interpreter 14 does not translate instructions, it merely decodes them and then executes them, one at a time. If a section of code is used often enough, the emulation controller 13 may decide to translate a section of code rather than interpret it. The controller 13 invokes the translator 17, which translates or converts a block of legacy code instructions into native code instructions, with a flag telling whether any reordering is allowed, including both speculative and non-speculative reordering. The translated code is stored in a temporary block (not shown). If the flag is set, then the translated or dynamic code is first temporarily stored in a scratch buffer during translation and reordering and is always saved into the dynamic code cache 15. Note that the term speculatively reordering means to schedule an operation before its control dependencies are resolved. However, some architectures permit data speculation as well, thus the term should encompass both control and data speculation. If the flag is not set, then the code is copied into the code cache 15. The native system controller 12 then executes the reordered contents of the code cache 15. The information database 16 is used by the controller 13 in deciding whether to reorder code, and stores the legacy code-to-native code address mappings, and also which translation blocks have been reordered. The database also tracks which sections of legacy code, if reordered, have trapped, and how many times they have trapped, and thus, is used by the controller 13 to set the reorder flag. Note that both the original legacy code and the dynamically generated native code or dynamic code are present in the process's virtual address space. Note that process and application are synonyms in this context. A process is a running instance of an application, i.e., there can be multiple processes (copies) of the same application running simultaneously on a system. In addition to emulating instructions, the interpreter 14 profiles the branch behavior of the legacy code 11 to detect regions of code suitable for reordering. The emulator 10 converts those regions to dynamic code and caches them in the cache. When the legacy ISA program is first loaded, the native operating system maps its text and data segments to memory, then maps the emulator, which comprises of a controller, an interpreter, and a translator. Execution begins in the interpreter, which executes one legacy ISA instruction at a time until it encounters a branch, then returns a status code indicating the branch outcome (taken/not taken) to the control system. The control system uses this information to maintain a branch prediction database stored database 16. When a basic block has been executed more than a preselected number of times (the translation threshold), the control system selects a trace of basic blocks representing an execution path which is likely to be taken. The translator compiles that trace into a native superblock, which is a single-entry multiple-exit code structure that can only be entered at the top. The translator then saves the superblock to the code cache, and an entry for it is inserted in the database. The database stores mappings between legacy ISA code addresses to superblock addresses. If the legacy ISA program branches to a location which has a mapping in the database, control is transferred to the corresponding superblock in the translation cache. Otherwise, the interpreter takes over, and executes one basic block before returning to the controller. Branches leaving a superblock can either branch back to the controller, or be dynamically linked to other superblocks using a chaining mechanism.

The technique that is used by the translator 17 is to first generate a translation for a group of instructions, or block of code, and then to reorder the translated instructions with respect to their original order, according to various optimization procedures, for example, scheduling in the earliest available slot. However, the instructions are scheduled or ordered in such a manner, that even if they are executed out of order, it is always possible to back out of the effects of executing them out of order, and roll back to a check point. A check point is a point in the translated code which corresponds to a point in the original program such that all operations appear to have executed sequentially.

Figure 2A:
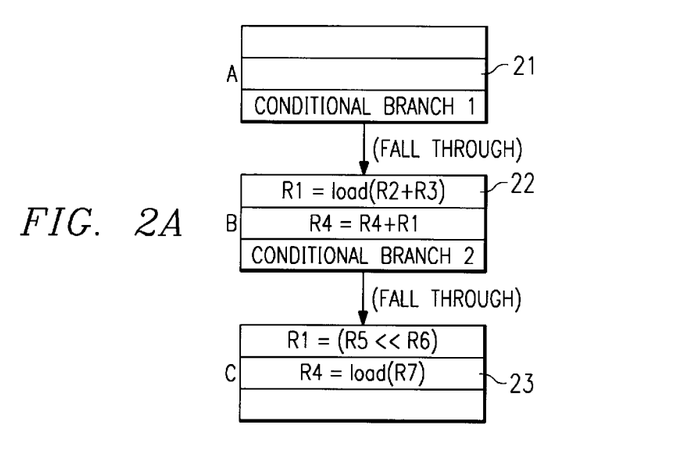
FIGS. 2A–2C depict an exemplary section of legacy code undergoing conversion in the system of FIG. 1.
Figure 2B:
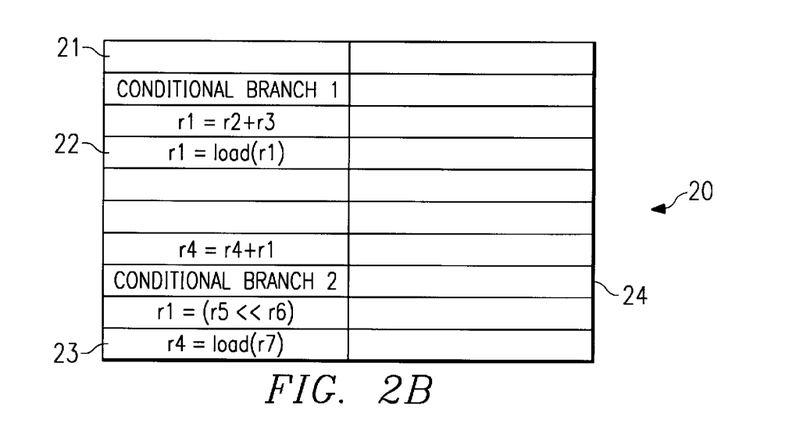
Figure 2C:
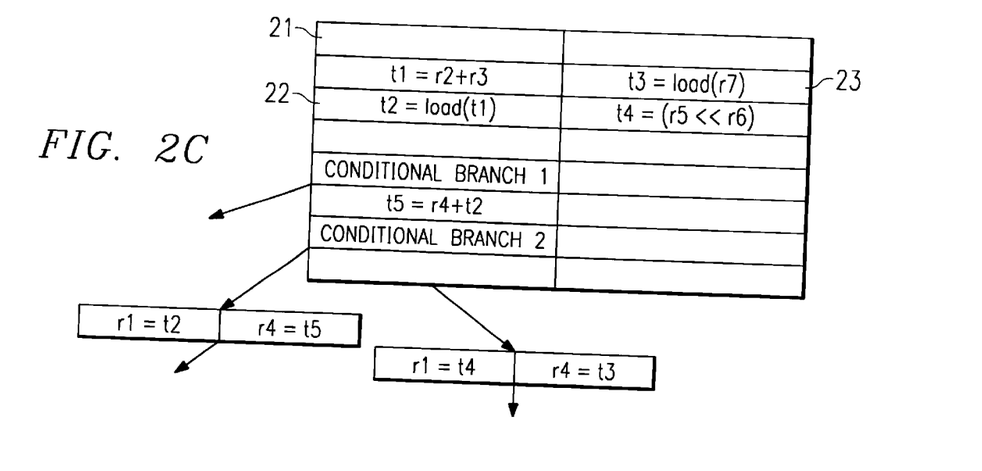
Figure 3A:
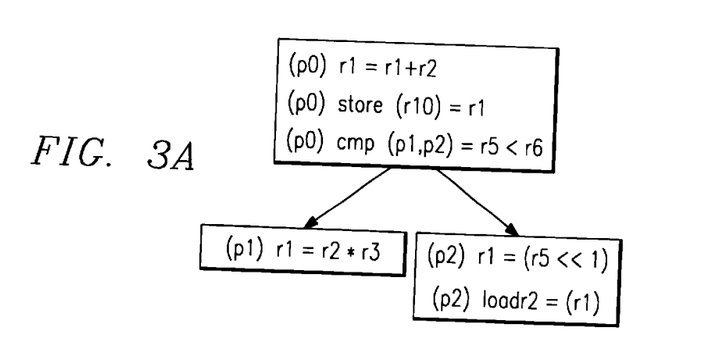
FIGS. 3A–3B depict an example of checkpoint live range extension.
Figure 3B:
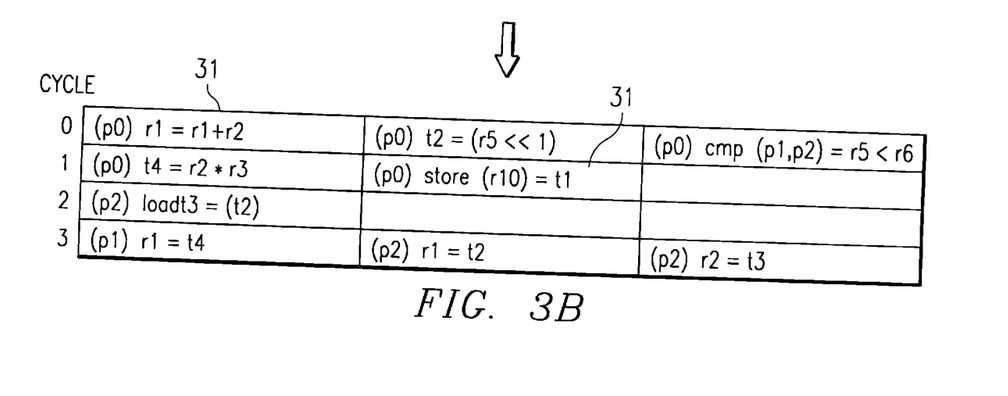

FIGS. 2A–2C depicts a section of legacy code undergoing translation. The code herein is shown for purposes of illustration only and is not to be construed as a limitation. FIG. 2A depicts the original legacy code, FIG. 2B depicts the code of FIG. 2A after translation, and FIG. 2C depicts the code of FIG. 2B after optimization or reordering. Note that this invention assumes that the native system will have more registers than the legacy system, and that a subset ($r_0 \ldots r_{N-1}$) of the native registers is used to hold the N user-visible legacy registers ($R_0 \ldots R_{N-1}$). Those registers are the home registers for the legacy ISA system's architectural state. The architectural state must always reside in the home registers at every superblock entry. The remaining native registers are used as temporaries. The section of code in FIG. 2A includes two load operations in basic blocks B and C at points 22 and 23, specifically R1=load(R2+R3) 22 and R4=load(R7) 23.

In FIG. 2B these load instructions have been translated into r1=load(t1) 22 and r4=load(r7) 23. Note that in FIG. 2B, that there is a second column 24, which is empty. This represents the ILP capacity of the native system, and since the code of FIG. 2B is in the same order as in FIG. 2A, the ILP capacity is not used, and thus is empty. The translator converts the legacy instructions into native operations. For example, the native ISA may be a 2-way VLIW (very long instruction word) machine whose instruction set resembles that of the legacy, except that load operations can take only one source operand. The level 1 data cache latency may be 3 cycles. The resulting unoptimized dyncode block, as shown in FIG. 2B, is a single-entry, multiple-exit code structure with the entry at the top.

In FIG. 2C, the load instructions have been reordered to take advantage of the ILP capacity of the native system, in that second load instruction 23 has been scheduled before the first load instruction 22. The translator speculates the load at translation time, i.e., schedules it in a slot which precedes its dependent branch. When the translated code is actually run, the load "speculatively" executes before the branch. Suppose the controller has decided to translate this trace, with both branches predicted to be not-taken. Thus, to hide the memory latency, the translator 10 may try to speculate both load operations above the first branch condition 26. The translator would use register renaming to break all write-after-read (WAR) and write-after-write (WAW) register dependencies, allowing loads and most other operations to be scheduled speculatively. The temporarily renamed results t2, t3, t4, and t5 are only committed to the architectural state when control dependencies are resolved.

During the renaming phase, a register map (RMAP) defining the dynamic legacy-to-native register mappings is computed. The initial RMAP maps each legacy register name $R_x$ to its corresponding physical architectural register $r_x$. Every time a destination architectural register is renamed, the corresponding RMAP entry is set to the virtual register name, and a snapshot of the current RMAP is saved and associated with the instruction. The unordered sequence of native instructions is called the sequential schedule. Note: an instruction a semantically precedes b if a appears before b in the sequential schedule.

Once the optimized code shown in FIG. 2C has been obtained, and executed, if the execution is successful, then the next section of original code is emulated. However, if a trap or exception occurs, then the state is reset back to the checkpoint. The checkpoint for this section of code is point 21. When a native instruction belonging to a superblock raises an exception, the emulator's native handler is invoked and uses the native ISA exception context delivered by the operating system to identify the trapping superblock and the trace of legacy ISA basic blocks from which it was translated. It retranslates the superblock, but stops immediately after the register assignment phase, and does not save the generated code to the dynamic code cache. It identifies the native ISA instruction which trapped and the associated checkpoint. It then resets the architectural registers to the state defined by the checkpoint's RMAP. If a legacy ISA register value resides in a temporary register, it transfers the temporary register value from the exception context to the architectural register. Then it sets the legacy ISA program counter to the address of the legacy instruction immediately following the checkpoint instruction or here to the address of the first basic block in the trace. The interrupted architectural state is backed up to this point, where it appears as though all preceding instructions in the program have been completed and all following instructions have never been executed. Note that the reconstructed state is not always consistent with the trapping point, as the checkpoint represents a point in time at or before the exception. Essentially, if a trap occurs, then the translator reverts back to the state corresponding to point 21, and proceeds as if the optimization in FIG. 2C had never taken place. Note that application is not notified of this exception.

After the state has been reset to point 21, the interpreter is invoked, which executes instructions of the legacy program, as shown in FIG. 2A. The interpreter always executes instructions sequentially in their original order, i.e., the interpreter never reorders. Thus, if the reordering or optimization is the root cause of the exception or trap, then by using the interpreter for this section of code, the exception would be avoided. For example, assume that the native instruction executing the second load prior to the first load causes a trap for some reason, e.g. the contents of $R_7$ is not valid until after an instruction subsequent to the first load has been performed or perhaps the conditional branch 25 is always true and the second load never actually takes place. The controller would be notified of the trap by the native system controller 12. The controller 13 consults the information database 16 to identify the original sequence of basic blocks (A, B, C) where the trap occurred. The controller then retranslates the basic block sequence to determine the native trapping operation, its corresponding legacy instruction, the most recent checkpoint, and the legacy-to-native register state mappings for that checkpoint. Since all speculative operations were renamed, the architectural state for that checkpoint is fully contained in the home registers $r_0$ to $r_{N-1}$. The translator will revert back to the checkpoint 21 in basic block A by setting the program counter of the legacy program to the top of basic block A or point 21. The translator will then invoke the interpreter, which will emulate the instructions of FIG. 2A sequentially, one at a time until the section is completed or control branches out of this section. Thus, code similar to that shown in FIG. 2B is executed by the interpreter.

If the interpreter successfully executes the section of code, then the next section of original code is emulated. Note that the application has not been notified of the exception. However, if the interpreter also traps, then the root cause of the exception is in the original code and not the reordering. Since, the interpreter is executing the code in a line-by-line manner, the precise cause of the exception can be more readily determined than if the code is reordered. The native operating system would then notify the emulator of the exception by invoking the emulator's own handler, and passing it a data structure describing the native machine state at the time of the interruption. This data structure is called an "exception context". The emulator's handler then uses the interrupted native state to compute the equivalent interrupted legacy state or architectural state, and packages it as a legacy exception context. Then, the legacy program is restarted at its own handler code, which has the effect of notifying the legacy program of the exception.

Thus, the purpose of the algorithm is to restart the user program at a point prior to the trapping instruction, and to force the instructions between that point and the trapping operation to be executed sequentially. If the trap is a true exception, the interpreter eventually raises the same exception a second time, invoking the translator's handler again, at which point the legacy ISA state has been sequentially updated and ready to be delivered to the user application's handler, which is emulated by either translation or interpretation.

Therefore, the inventive translator can be optimistic or speculative in the reordering of instructions, but also guarantees correct execution if the reordering was improper. Without the inventive emulator, translations would have to be more conservative, and would not reorder the load instructions in blocks B and C. Thus, the translator would basically wait until all the branch conditions have been evaluated, and then execute the load instructions only until called for by the program flow, and consequently incur the wait penalties associated with the load instructions.

Another feature of the inventive emulator has the capability to halt reordering if a section of translated code falsely traps a predetermined number of times. The preferred embodiment is have the predetermined number equal to one. Since most applications or programs have branches to different sections of code, then the same section of translated code could be executed many times during the running of a program. If this section of reordered, translated code should falsely trap each time it is executed, then each trap will invoke the translation recovery procedure, which is costly in terms of time. More specifically, it would be faster to merely translate without reordering, than to reorder, execute, trap, recover, then emulate line-by-line.

Therefore, the database 16 stores the addresses of sections of translated code that have trapped, either true or false traps, more than a predetermined number of times. The controller 13 reviews this information to determine whether to set the reordering flag. If the flag is not set, then the translator translates code without optimization. Thus, false exceptions will not be generated, however, true exceptions will still occur. Note that the information database 16 keeps track of which blocks have not been reordered. Thus, if a non-reordered block traps (a true trap), then the system's native handler does not need to call the interpreter, because the legacy code state is consistent with the exception, and the legacy true exception can be processed immediately.

The rationale is that a speculative operation such as a load will either never trap or trap very frequently. There are three possible explanations for a frequently trapping speculative operation: (1) the translator made a bad optimization decision, like speculating a linked list dereference operation before checking that the pointer is non-zero; (2) the application was designed to take advantage of exceptions, e.g., a database program accessing a sparse memory area using on-demand allocation; and (3) the application is buggy. Therefore, each subsequent time that this section of non-reordered, translated code is executed, it will not falsely trap. Note that this would not be possible with a static compiler. This is only possible because a dynamic translator can compile and recompile at run-time and make those decisions at run-time, in other words the translator is adaptive.

An advantage of the inventive translator is that no ISA support for hardware deferred exception tags is required. The prior art considers speculating a potentially trapping operation, such as a load, unsafe unless the native ISA supports hardware deferred exception tags. In the prior art, if a speculative load operation causes an access violation, it silently sets an exception tag bit in the destination register. This bit is then propagated to other operations in a data-flow manner. An exception is raised only when a non-speculative operation consumes an operand with the bit set. With this hardware feature, only true code exceptions need to be handled. However, by relying upon ISA hardware deferral, the translator would be tied to a particular architecture. Thus, by not using hardware deferral mechanisms, the translator is hardware independent.

During the scheduling phase, the translator reorders the instructions to take advantage of the native machine's microarchitecture and exploit ILP. Every instruction in the optimized schedule is associated with a checkpoint. The optimized schedule is the sequence of native instructions after reordering. Note that at any given cycle in an optimized schedule, a critical instruction x is committed if x and all critical instructions semantically preceding x have already been scheduled. The current checkpoint is the committed instruction with the highest cycle number in the sequential schedule. If there currently is no committed instruction, the default checkpoint is an imaginary instruction whose associated RMAP is the initial RMAP. In the example shown in FIGS. 2A–2C, the checkpoint 21 is the entry point into basic block A. However, other code locations may be used as checkpoints. Instructions whose side-effects cannot be undone (such as stores to memory) also may be checkpoints. The inventive translator allows much flexibility in the selection of checkpoints, but a few rules must be followed. First, when the translator optimizes a code block, it must guarantee that the architectural state for the most recent checkpoint can always be reconstructed from an interrupted native register state. In other words, the translator must be able to revert back to the previous checkpoint, this includes the execution of both speculated and non-speculated instructions or operations. This is only possible if all effects of the operations that have been executed since the checkpoint can be undone or reversed. Most operations are of this type, so for example, if two numbers are added together and stored in another register, then there is a technique known as renaming to undo the effects, if needed.

However, there are certain operations that cannot be undone. For example, a store operation, that stores to memory. It is very hard, if not impossible, for a translator to undo or reverse a store instruction, because it has been committed to main memory, and overwritten was already there. Thus, another rule is that a store instruction cannot be speculated above its dependent branch. Likewise, if the code is predicated code, a store cannot be scheduled before its dependent compare operation. Also, on any given path, store operations cannot be reordered with respect to each other and must not be speculated. This ensures that control dependencies are met and that memory is updated sequentially. On the other hand a load instruction can be readily undone, as a load transfers a value from memory into a register (as opposed to a store, which transfers the value from the register into memory). A load is easy to undo because a second register, a temporary or scratch register, is used in the procedure.

Another rule is that a branch cannot be speculated above another branch. Thus, if there is a branch followed by another branch, then these two branches cannot be reordered with respect to each other. If the code is predicated code, then instead branches in the translation, flags called the predicates are used. A conditional branch is translated into a compare operation which sets two predicates to either true or false. Thus, the two compare operations cannot be reordered with respect to each other. This also ensures that control dependencies are met and that memory is updated sequentially.

Another rule is that a store operation must be scheduled after all semantically preceding operations. This ensures exception recoverability of the translator. When a value is stored to memory, all operations preceding the store in the sequential schedule have executed and their results reside in a set of native physical registers.

However, it may be possible to allow side-exit branches to be scheduled early, and thus, eliminate the restriction that they must be scheduled after all semantically preceding operations. To preserve correctness, the semantically preceding operations which have not yet been scheduled when the branch is taken must be copied into the branch's exit stub. The exception recovery algorithm would then need to be extended to handle exceptions raised inside of exit stubs.

Another rule is that other operations are freely scheduled or ordered, as long as their read-after-write (RAW) dependencies are satisfied. In other words, if some operation A supplies a result used by operation B, then B cannot be executed before A. Thus, B cannot be speculated before A. Thus, the only dependencies that have to be met are the RAW dependencies, assuming the other rules have been met, they can be freely ordered with respect to each other. Note that since some ISAs provide a data speculation capability, which allows a compiler to schedule a load before a store, even when the two cannot be statically proven to not alias. For a description of data speculation refer to W. Y. Chen, "Data Preload for Superscalar and VLIW Processors", Ph.D. Thesis, U. of Illinois, Urbana-Champaign, Ill., 1993, which is incorporated herein by reference, S. Mahlke et al., "Sentinel Scheduling for VLIW and Superscalar Processors", Proc. 5th Annual Intl. Conf. on Arch. Support for Prog. Lang. and Op. Systems, October 1992, 238–247, which is incorporated herein by reference, and B. Rau, "PlayDoh External Architecture Specification", technical report 93–80, Hewlett Packard Laboratories, which is incorporated by reference.

Next, physical registers are allocated and assigned to virtual registers. The virtual registers belonging to the final branch's RMAP (instruction j) are treated specially: if legacy ISA register name R x is mapped to virtual register t, then the allocator tries to assign the architectural register r x to t, which would have the effect of canceling the renaming of the last definition of r x. This is only possible if r x is not live when t is defined. This is an attempt to reduce the number of copy operations at the end of the superblock when the first two conditional branches are not taken. All other virtual registers are assigned a scratch register.

The last step is to generate additional code at all exit points in order to flush all legacy ISA register values back to their appropriate architectural registers, whenever necessary. If some flushing is required, the exit branch is modified to target a small stub which performs the necessary register copies, then branches back to the controller. Otherwise, the exit branch targets the controller directly. The controller can use a chaining algorithm similar to the one used by Shade to distinguish between the different incoming branches, and to potentially patch them to target other superblocks in the future. (reference: R. Cmelik, D. Keppel, "Shade: a Fast Instruction Set Emulator for Execution Profiling", Sun Microsystems technical report UWCSE 93-06-06)

The inventive translator can operate with predicated code. Predication allows the translator to optimize multiple control flow paths simultaneously. In other words, predication allows the grouping together of a number of instructions that conceptually belong to multiple control paths. Without predication, a region would be restricted to a linear trace, but the scheduling algorithms would remain mostly identical. As used herein, the notation '($P_n$) operation' denotes that operation is only executed when predicate $P_n$ is true, and the special predicate $P_0$ is always true.

Figures 4A, 4B:
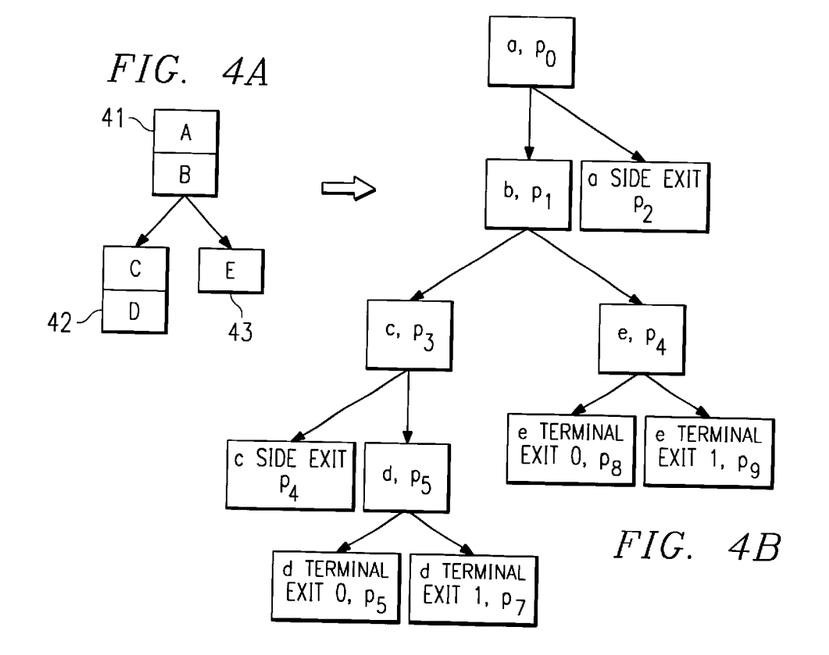
FIGS. 4A–4C depict the conversion of an example of predicated code by the system of FIG. 1.
Figure 4C:
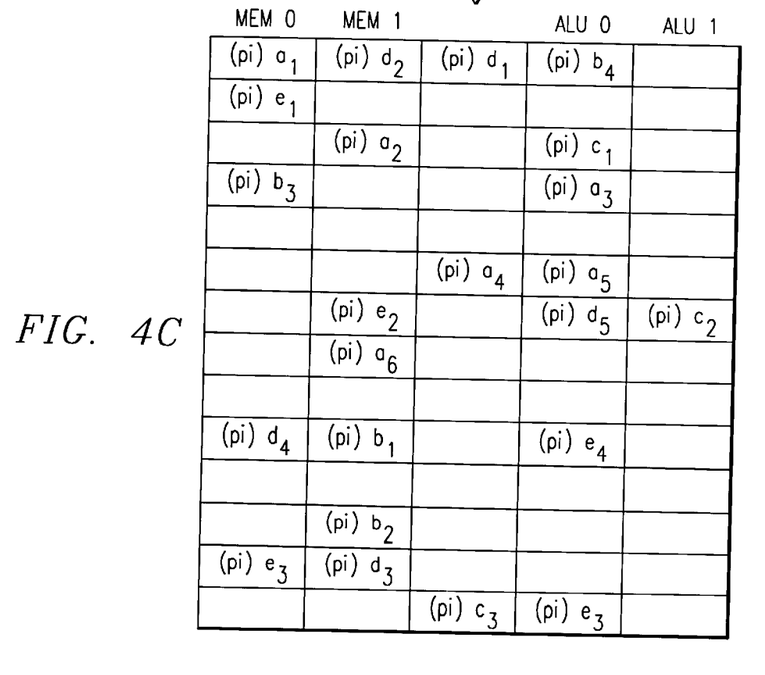

FIGS. 4A–4C depict the translation of predicated code. The code shown herein is for purposes of illustration only and is not to be construed as a limitation. FIG. 4A depicts the original legacy code, with FIG. 4B depicting the translated code of FIG. 4A, and FIG. 4C depicts the scheduled or reordered code of FIG. 4B. In FIG. 4A that the legacy code has a branch condition in basic block B which leads to either basic blocks C or E. Note the difference with respect to FIG. 2A where the targets of the branches were not profiled. In FIG. 4B, the basic block tree of FIG. 4A has been translated or decoded to include predicate guards. In FIG. 4C, the tree of predicate guard blocks have been expressed as one unit or hyperblock which includes all of the instruction present in basic blocks A, B, C, D, and E. Each instruction has a predicate flag which activates particular instructions depending on whether flow is moving from block B to block E or from block B to block C. Thus, predication allows the translator to optimize larger pieces of code by grouping together a whole bunch of blocks. Without predication, the translator must choose a single path to optimize, as in FIGS. 2A–2C, whereas with predication all possible paths or at least two paths can be optimized. Therefore, with predication operations from C as well as from E can be speculated, regardless of which path is taken during execution, thus achieving a higher overall performance.

Translation is performed in the following steps. First, each legacy ISA basic block is decoded and translated into a guarded block (GB), i.e., a group of native operations executing under the same guard predicate. A conditional branch instruction at the end of a block is translated to a compare operation which sets two predicates representing the taken and not-taken outcomes. This implies that a (possibly empty) GB is also created for every possible side-exit or terminal exit. At the end of this phase, the region of legacy basic blocks has been converted to a graph of GBs, as illustrated by FIG. 4B. The diagram shows the name of each GB along with its guard.

The next phase is scheduling or reordering. Operations from each GB are assigned to the first available execution slot in the hyperblock satisfying their read-after-write (RAW) dependencies and operational latencies, as shown in FIG. 4C. Note that pi is used to indicate that the actual predicate, p0–p9, that would guard the native instructions, a1–e4, depends on the scheduling procedure that is used. Gbs corresponding to basic blocks with higher entry probabilities are processed first and therefore have a higher scheduling priority. Within a GB, operations are assigned from top to bottom. This algorithm was selected for its speed advantage over a traditional critical-path-driven list scheduler, however, others could be used. During this phase, writes to architectural register state are automatically renamed to target pseudo registers. This removes WAR and WAW dependencies. If an operation is speculatively scheduled above its dependent predicate compare operation, the algorithm walks up the tree to find the most recently scheduled compare operation on the path and changes the operation's predicate accordingly.

Next is the retire phase. For each possible exit (i.e., leaf GB), register copy operations are scheduled in order to transfer renamed architectural register values from pseudo registers back to the appropriate home registers. A branch instruction is also scheduled after the last copy to transfer control out of the hyperblock. Terminal exits have higher priority than side exits and are processed first.

Finally, register allocation is performed on the pseudo registers using a simple def/last-use algorithm. The algorithm does not distinguish between two live ranges residing on mutually exclusive control paths, and assumes that they interfere if their (def cycle, last-use cycle) range overlaps. Other algorithms could be used. The retire and register allocation phases could be combined to reduce register pressure and the number of register copy operations.

If an exception occurs during execution, a similar translator exception recovery mechanism is invoked as discussed with respect to FIGS. 2A–2C. Should an exception occur in the code from block C for example, then the translator backs up to the most recent prior checkpoint, for example the entry into block A, and invokes the interpreter which executes the instructions in a line-by-line manner. If the exception does not reoccur, the next section of code is operated upon. If the exception reoccurs, then the application is notified and other exception recovery mechanisms are instituted.

Note that this inventive translator is operating during run time, and does not require recompilation. The original code is being run on the new architecture and dynamically translated to run on the new architecture by the translator. Further note that the inventive translator does not actually change the original legacy code, i.e. the original code is not rewritten, but rather is maintained in a separate code buffer. The translation in code cache, which is generated dynamically is what is manipulated by the controller and is executed by the native system.

Although the present invention and its advantages have been described in detail, it should be understood that various changes, substitutions and alterations can be made herein without departing from the spirit and scope of the invention as defined by the appended claims.

What is claimed is:

1. A method for dynamically translating instructions in original code written for a first architecture into native code for a second architecture, the method comprising the steps of:

analyzing a section of the original code;

designating at least one checkpoint in the section;

translating the instructions into native code instructions; and reordering, speculatively, placement of at least one native code instruction.

2. The method of claim 1, further comprising the step of:

profiling the original code to identify the section.

3. The method of claim 1, further comprising the step of:

a executing the one speculatively reordered native code instruction and any non-reordered native code instructions.

4. The method of claim 3, wherein at least one of the executed code instructions traps, the method further comprising the steps of:

resetting the original code to the checkpoint; and executing, via interpretation, the original code sequentially in a line-by-line manner until the section is completed.

5. The method of claim 4, wherein the step of resetting comprises the steps of:

identifying the section which is associated with the trapped executed code instruction;

retranslating the section to determine the checkpoint;

changing a program counter of the original code to the checkpoint; and reversing an effect of each native instruction which has been executed and is subsequent to the checkpoint.

6. The method of claim 4, wherein:

after the steps of changing and reversing have operated, any native instructions which correspond to original instructions which are sequentially prior to the checkpoint have been executed, and any native instructions which correspond to original instructions which are sequentially subsequent to the checkpoint have not been executed.

7. The method of claim 4, wherein the step of executing, via interpretation, successfully completes the section of code, the method further comprises the steps of:

determining an address of the original code instruction that corresponds to the trapping native code instruction;

counting a number of times the original code instruction has trapped; and blocking any reordering of the native code instruction when the number exceeds a predetermined number.

8. The method of claim 4, wherein the step of executing, via interpretation, has not successfully completed the section of code and has trapped, the method further comprises the steps of:

notifying an application which comprises the original code of the trap; and providing the application with information relating to an original code instruction which corresponds to the trapping instruction.

9. The method of claim 4, wherein:

the section is completed when a branch instruction removes flow control from the section.

10. The method of claim 4 wherein:

the section is completed when the last instruction in the section has been executed.

11. The method of claim 1, wherein:
the section of original code, contains multiple execution paths; and
the native code is predicated code.

12. The method of claim 1, wherein:
the step of reordering operates according to an optimization procedure.

13. The method of claim 1, wherein:
an entry point into a block, of code in the section is designated as the checkpoint.

14. The method of claim 1, wherein the step of analyzing comprises the steps of:
determining which instructions of the original code can be reordered; and
determining which instructions of the original code cannot be reordered.

15. The method of claim 14, wherein:
the step of designating designates an instruction that cannot be reordered as the checkpoint.

16. The method of claim 1, further comprising the step of:
storing the native code instructions in a dynamic code cache.

17. The method of claim 1, further comprising the step of:
storing a mapping of original code to native code.

18. The method of claim 1, further comprising the step of:
storing an indication of the reodering of the at least one native code instruction.

19. A method for dynamically translating instructions in original code written fore first architecture into native code for a second architecture, the method comprising the steps of:
analyzing a section of the original code;
designating at least one checkpoint in the section;
translating the instructions into native code instructions;
reordering, speculatively, placement of at least one native code instruction;
executing the one speculatively reordered native code instruction and any non-reordered native code instructions; and
handling a trap that has occurred during the step of executing by resetting the original code to the checkpoint, and executing, via interpretation, the original code sequentially in a line-by-line manner until the section is completed.

20. The method of claim 19, wherein the step of handling comprises the steps of:
identifying the section which is associated with the trapped executed code instruction;
retranslating the section to determine the checkpoint;
changing a program counter of the original code to the checkpoint; and
reversing an effect of each native instruction which has been executed and is subsequent to the checkpoint.

21. The method of claim 20, wherein:
after the steps of changing Add reversing have operated, any native instructions which correspond to original instructions which are sequentially prior to the checkpoint have been executed, and any native instructions which correspond to original instructions which are sequentially subsequent to the checkpoint have not been executed.

22. The method of claim 19, wherein the step of handling successfully completes the section of code, the method further comprises the steps of:
determining an address of the original code instruction that corresponds to the trapping native code instruction;
counting a number of times the original code instruction has trapped; and
blocking any reordering of the native code instruction when the number exceeds a predetermined number.

23. The method of claim 19, wherein the step of handling has not successfully completed the section of code and has trapped, the method further comprises the steps of:
notifying an application which comprises the original code of the trap; and
providing the application with information relating to an original code instruction which corresponds to the trapping instruction.

24. The method of claim 19, wherein:
an entry point into a block of code in the section is designated as the checkpoint.

25. The method of claim 19, wherein the step of analyzing comprises the steps of:
determining which instructions of the original code can be reordered; and
determining which instructions of the original code cannot be reordered;
wherein the step of designating designates an instruction that cannot be reordered as the checkpoint.

26. The method of claim 19, further comprising the steps of:
storing the native code instructions in a dynamic code cache;
storing a mapping of original code to native code; and
storing an indication of the reordering of the at least one native code instruction.

27. A system for dynamically translating instructions in original code written for a first architecture into native code for a second architecture, the system comprising:
means for analyzing a section of the original code;
means for designating at least one checkpoint in the section;
means for translating the instructions into native code instructions; and
means for speculatively reordering placement of at least one native code instruction.

28. The system of claim 27, further comprising:
means for profiling the original code to identify the section.

29. The system of claim 27, further comprising:
means for executing the one speculatively reordered native code instruction and any non-reordered native code instructions.

30. The system of claim 29, wherein at least one of the executed code instructions traps, the system further comprising:
means for resetting the original code to the checkpoint; and
means for executing, via interpretation, the original code sequentially in a line-by-line manner until section is completed.

31. The system of claim 30, wherein:
the means for resetting operates to identify the section which is associated with the trapped executed code instruction, retranslate the section to determine the checkpoint, change a program counter of the original code to the checkpoint, and reverse an effect of each native instruction which has been executed and is subsequent to the checkpoint.

32. The system of claim 31, wherein:
after the means for resetting has operated, any native instructions which correspond to original instructions which are sequentially prior to the checkpoint have been executed, and any native instructions which correspond to original instructions which are sequentially subsequent to the checkpoint have not been executed.

33. The system of claim 30, wherein the means for executing, via interpretation, has successfully completed the section of code, the system further comprises:

means for determining an address of the original code instruction that corresponds to the trapping native code instruction;

means for counting a number of times the original code instruction has trapped; and means for blocking any reordering of the native code instruction when the number exceeds a predetermined number.

34. The system of claim 30, wherein the means for executing, via interpretation, has not successfully completed the section of code and has trapped, the system further comprises:

means for notifying an application which comprises the original code of the trap; and means for providing the application with information relating to an original code instruction which corresponds to the trapping instruction.

35. The system of claim 30, wherein:

the section is completed when a branch instruction removes flow control from the section.

36. The system of claim 30, wherein:

the section is completed when the last instruction in the section has been executed.

37. The system of claim 27 wherein:

the section of original code contains multiple execution paths; and the native code is predicated code.

38. The system of claim 27, wherein:

the means for reordering operates according to an optimization procedure.

39. The system of claim 27, wherein:

an entry point into a block of code in the section is designated as the checkpoint.

40. The system of claim 27, wherein the means for analyzing comprises:

means for determining which instructions of the original code can be reordered; and means for determining which instructions of the original code cannot be reordered.

41. The system of claim 40, wherein:

the means for designating designates an instruction that cannot be reordered as the checkpoint.

42. The system of claim 27, wherein:

the native code instructions are stored in a dynamic code cache.

43. The system of claim 27, wherein:

a mapping of original code to,native code is stored in a table.

44. The system of claim 27, wherein:

an indication of the reordering of the at least one native code instruction is stored in a table.

45. A system for dynamically translating instructions in original code written for a first architecture into native code for a second architecture, the system comprising:

means for analyzing a section of the original code;

means for designating at least one checkpoint in the section;

means for translating the instructions into native code instructions;

means for speculatively reordering placement of at least one native code instruction;

means for executing the one speculatively reordered native code instruction and any non-reordered native code instructions; and means for handling a trap that has occurred during operation of the means for executing, by resetting the original code to the checkpoint, and executing, via interpretation, the original code sequentially in a line-by-line manner until section is completed.

46. The system of claim 45, wherein:

the means for resetting operates to identify the section which is associated with the trapped executed code instruction, retranslate the section to determine the checkpoint, change a program counter of the original code to the checkpoint, and reverse an effect of each native instruction which has been executed and is subsequent to the checkpoint.

47. The system of claim 46, wherein:

after the means for resetting has operated, any native instructions which correspond to original instructions which are sequentially prior to the checkpoint have been executed, and any native instructions which correspond to original instructions which are sequentially subsequent to the checkpoint have not been executed.

48. The system of claim 45, wherein the means for executing, via interpretation, has successfully completed the section of code, the system further comprises:

means for determining an address of the original code instruction that corresponds to the trapping native code instruction;

means for counting a number of times the original code instruction has trapped; and means for blocking any reordering of the native code instruction when the number exceeds a predetermined number.

49. The system of claim 45, wherein the means for executing, via interpretation, has not successfully completed the section of code and has trapped, the system further comprises:

means for notifying an application which comprises the original code of the trap; and means for providing the application with information relating an original code instruction which corresponds to the trapping instruction.

50. The system of claim 45, wherein:

an entry point into a block of code in the section is designated as the checkpoint.

51. The system of claim 45, wherein the means for analyzing comprises:

means for determining which instructions of the original code can be reordered; and means for determining which instructions of the original code cannot be reordered;

wherein the means for designating designates an instruction that cannot be reordered as the checkpoint.

52. The system of claim 45, wherein:

the native code instructions are stored in a dynamic code cache;

mapping of original code to native coded; and an indication of the reordering of the at least one native code instruction os stored in the table.

* * * * *

UNITED STATES PATENT AND TRADEMARK OFFICE
CERTIFICATE OF CORRECTION

PATENT NO.      : 6,631,514 B1
DATED           : October 7, 2003
INVENTOR(S)     : Bich-Cau Le It is certified that error appears in the above-identified patent and that said Letters Patent is hereby corrected as shown below:

Column 12,
Line 12, after "of" delete "a"

Column 13,
Line 29, delete "fore" and insert therefor -- for --
Line 56, delete "Add" and insert therefor -- and --

Column 16,
Line 65, delete "os" and insert therefor -- as --

Signed and Sealed this

Twenty-third Day of November, 2004

JON W. DUDAS
*Director of the United States Patent and Trademark Office*